United States Patent Office 3,446,775
Patented May 27, 1969

3,446,775
POLYMERS CONTAINING GEM-DITHIOETHER GROUPS AND PROCESS THEREFOR
Eugene R. Bertozzi, Yardley, and Morris B. Berenbaum, Levittown, Pa., assignors to Thiokol Chemical Corporation, Bristol, Pa., a corporation of Delaware
No Drawing. Filed Aug. 31, 1965, Ser. No. 484,122
Int. Cl. C08g 1/12, 1/22
U.S. Cl. 260—67
10 Claims

ABSTRACT OF THE DISCLOSURE

Mercaptoalcohols react with aldehydes or ketones to form first dihydroxy gem dithioethers and secondly polymers containing sequentially alternate gem dithioether and gem diether linkages. Both products may be etherified by removal of water. Any of the above polymers, per se, or after reaction with polyisocyanates form useful plastic or rubbery products.

---

This invention relates to novel polymers which contain sequentially alternate units of gem dithioether groups and oxygen groups that may be gem diether and/or ether groups and to a novel process therefor.

It is an object of this invention to provide useful polymeric substances which contain sequentially alternate gem dithioether groups and oxygen groups, and to provide a novel process therefor.

Polyethers, polythioethers and their polyurethanes are well known useful polymeric substances and are or form useful plastics or rubbers, or fluids that may be useful as plasticizers and lubricants. Polymers which contain a plurality of ether or thioether linkages have also found similar uses. Polymers which contain gem dithioether linkages,

or gem diether linkages,

have been found to be especially useful in the formation of rubbery products, each type of linkage contributing its own peculiar properties to the polymers formed therewith. For example, gem dithioether linked polymers exhibit in general better rubbery properties than do otherwise identical polythioether polymers which latter do not have consecutive sulfur atoms in the polymer backbone molecule conjoined to the same carbon atom. On the other hand, gem dithioether polymers exhibit less rubbery properties than do otherwise identical gem diether linked polymers, with the possible sole exception of the polymethylene gem diethers, or as they are sometimes known the polyformaldehyde polymers, which are plastics. Further, the gem diether polymers also have better rubbery properties than the otherwise identical polyether polymers wherein however the consecutive oxygen atoms are not conjoined to the same carbon atom. Some polyethers indeed are plastics. Another useful property of polymers which depends in great measure on the particular linkages therein is that of the degree of resistance to chemical attack or to dissolution by solvents or water. For example, in general, gem dithioether polymers exhibit greater resistance to chemical attack and/or dissolution than do otherwise identical polythioethers wherein the consecutive sulfur atoms are not conjoined to the same carbon atom; further the gem dithioethers in general far surpass both otherwise identical gem diether polymers and polyether polymers in such resistance. The gem dithioether polymers differ from otherwise identical disulfide linked polymers merely by having a carbon atom interposed between the two sulfur atoms, and yet the gem dithioether polymers show markedly improved resistance to chain scission than do the disulfides, and yet show almost as comparable resistance to dissolution on an equivalent sulfur content basis as do the disulfide linked polymers. One may thus readily see the desirability in being capable of preparing at will materials which contain both gem dithioether and gem diether and/or ether linkages in the same polymer.

The novel polymers of this invention provide unusual utility in combining in both a unique and a prescribable fashion gem dithioether linkages with gem diether and/or ether linkages in the same polymer molecules. The practitioner, therefore, may now according to the teachings of the invention prescribe a polymer of specific structure to suit specific requirements for chemical and physical properties in specific end use applications. The polymeric materials of this invention have backbone structures which prescribably contain consecutively alternate linkages that are gem dithioether and either gem diether and/or ether groups conjoining repetitive divalent organic intervening groups. These unusual polymers are prepared by a unique method.

Our process for preparing these unusual polymeric materials proceeds basically in first step through the reaction of a mercaptoalcohol, HS—Q—OH, with a carbonyl compound

such as an aldehyde or a ketone. The "Q" group is an organic divalent intervening group that preferably may be nonreactive with isocyanate and is in general any organic group, for example, any that is aliphatic, aromatic, alicyclic or alkaryl in nature and which indeed may contain pendant halogen, alkyl, nitro or other nonoxidizing chemical groups, the carbon chains thereof also may be interrupted by olefinic groups,

or by chalcogen, that is sulfur and/or oxygen, atoms or by urethane or urea groups. The R and R' groups of the carbonyl are similarly defined as was Q, but are monovalent in nature and additionally may be hydrogen, as in formaldehyde. Further R and R' may be the same or different.

According to our method, the reactant mercaptoalcohol and carbonyl first are admixed in the presence of a strong nonoxidizing acid, which acts as a catalyst, and in the absence of water. An inert organic solvent is usually present as a process aid. At this point in the process, mercaptan groups of the alcohol preferentially react with the carbonyl, with the evolution of heat, to form a dihydroxy gem dithioether, wherein the terminal hydroxyls are each separated from the central gem dithioether group by the intervening group Q. Water is produced as a by-product. This reaction is continued until substantially all mercaptan groups have reacted with carbonyl, e.g. two equivalents of mercaptan per equivalent of carbonyl to provide each equivalent of gem dithioether and mol of water. Desirably, if more than one equivalent of carbonyl is present in the reaction mixture per two equivalents of mercaptan, e.g. the ratio of equivalents

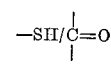

is <2/1, following completion of the first reaction the unreacted carbonyl remaining then reacts to join molecules of the dihydroxyl-containing gem dithioether product first formed in repetitive polymer formation until all carbonyl is consumed or until the polymer product formed is removed from the reaction medium, as by separation as a solid or an oil. Again water is formed as a by-product. Thus, in the first step one may prepare a polymeric substance according to the invention which contains sequentially alternate units of gem dithioether groups and gem diether groups. Enough carbonyl reactant must initially be charged, however, to provide a ratio of equivalents of mercaptan to carbonyl that is less than 2/1. The stoichiometric limiting ratio to provide this alternating structure is an

ratio of about 1/1. If yet more carbonyl is present, i.e. to provide a ratio

of <1/1, the carbonyl will merely be present in unreacted excess. The first step may be conducted at effective temperatures of 15 to 150° C. in effective reaction intervals of about 0.5 to 60 minutes. The alternating gem dithioether-gem diether polymeric product has reactive groups which are predominantly hydroxyl.

Thus, according to the invention, by prescribing an

ratio of 2/1 under the process conditions, only the dihydroxy gem dithioether compound is formed; by prescribing an

ratio of less than 2/1 to 1/1 one may obtain however a polymer having sequentially alternate linkages of gem dithioether and gem diether groups.

The foregoing polymers of this invention are of prescribable molecular weight that is merely dependent and calculatable upon the weights of the intervening group Q and the groups R and R' and upon the exact ratio of

used. If these polymers having alternate gem dithioether and gem diether linkages and hydroxyl activity are the ones desired for specific end use, such as for polyepoxide modification purposes or as reactants in urethane formation, the polymers may readily be isolated from their reaction mixtures by a cautious removal, say by volatilization, of water and solvent at temperatures of about 10 to 30° C. and under reduced pressures, and, if needed, removal of the acid catalyst by formation of some insoluble salt therewith and its filtration and separation from the polymer product.

One may also prepare polymers of this invention which contain prescribable sequentially alternate linkages of gem dithioether and ether groups, or indeed contain prescribable sequentially alternate linkages of gem dithioether groups interposed between both ether and gem diether groups by a second process step of the invention. This may be termed etherification. Molecules of the dihydroxy gem dithioether compound, and/or the hydroxyl-containing alternating gem dithioether-gem diether linked polymer may be joined by chain-extension with ether linkages according to this process by forcible removal both of the water of reaction formed in the first step and the water formed by etherification of hydroxyls, at elevated temperatures and in the presence of catalytically effective quantities of a strong non-oxidizing acid. Such chain-extension is unusual in that the either linkages formed always are proximal to gem dithioether linkages and separated therefrom by Q intervening groups.

Etherification is promoted by forcible removal of water of reaction at temperatures of about 50 to 250° C. The etherification reaction products, in turn, may then continue to undergo further etherification to further chain extend the molecules, but always providing thereby an alternation of gem dithioether linkages between gem diether and/or ether linkages. The proportion of gem diether to ether groups, in general, appears to determine the physical state of the polymeric product obtained first. If all the oxygen groups are gem diether, liquid to low melting solid polymeric products are usually formed in a molecular weight range of about 400 to 10,000, whereas if all the oxygen groups are ether in nature then usually low melting waxes to either rubbery or thermoplastic solids are formed in the molecular weight range of 400 to over 1 million. Further, the reaction products invariably contain a plurality of active hydrogen groups, e.g. OH or SH groups, such as is determinable by the Zerewitinoff method described by Kohler in J. Amer. Chem. Soc. 49, 3181 (1927). This is confirmed by positive chemical tests for hydroxyl and mercaptan.

The average molecular weight and the exact configuration, that is to say the sequence of alteration of gem dithioether, ether and gem diether linkages, of the present polymers according to the invention also is prescribable by not only the quantities of reactants used, say the proportions one to another of dihydroxyl gem diether compounds and hydroxyl-containing alternating gem ditheoether-gem diether linked polymers having perhaps different R, R' and Q intervening groups and different molecular weights that are used, but also by the amount of water of reaction that is forcibly removed. The water produced in each of the steps may easily be calculated from the fact that one mol of water is produced per equivalent of gem dithioether linkage and per equivalent of gem diether linkage formed in the first step, and per equivalent of ether linkage formed in the second step.

The occasional presence of small amounts of mercaptan as terminal groups in some of the polymeric products is interesting, and is believed to occur by the occasional formation of an gem diether or an ether group by the condensation of hydroxyl of a mercaptoalcohol molecule and the hydroxyl of a molecule of any of the reactants or reactions in a chain-termination action. It is interesting to note that the better the admixture of reactants in or the longer the reaction time of the first and etherification steps the smaller the mercaptan content and concomittantly the higher the hydroxyl content of the gross polymeric product obtained.

The etherification may be carried out at effective reaction temperatures of about 50 to 250° C., and for effective reaction intervals of about 1 to 200 hours. The preferred reaction temperature is the normal boiling point of the lowest boiling reactant, or of the inert organic solvent, or of their water azeotrope.

Exemplarily the instant process may be carried out in continuous fashion by charging the reactants, solvent and catalyst at room temperature, e.g. 15 to 30° C., and slowly bringing the temperature up to the reflux temperatures of the solvent, and of the water formed as a by-product. This may be carried out over a period of a few minutes to about an hour during which the gem dithioether-gem polymer forming reactions are believed to occur. As previously noted, if no etherification of the gem dithioether-gem diether product is desired, the water of reaction may be removed at this point by dehydration of the pot mixture, say with an otherwise inert desiccant or by evaporation of the water under vacuum at low temperatures, e.g. 10 to 30° C. The solvent may also thus be removed. The acid catalyst may be removed by forming an insoluble salt and filtration. If etherification of the product is desired, it is promoted by forcibly removing water formed as a product at elevated temperatures such as by azeotropic distillation with the solvent. The acid catalyst then may be neutralized and/or removed, as may be the solvent, to yield the desired and separated polymeric product.

In the removal of the water of reaction, the higher the reaction temperature the faster is etherification promoted.

Thus, the total effective reaction time interval for the first and second steps may extend from about 1 to 200 hours dependent upon the nature of the specific reactants, the specific acid catalyst and the specific temperatures of reaction used over the effective temperature range of 15 to 250° C.

Inert solvents which desirably may be used as process aids include the aliphatic and aromatic hydrocarbons such as nonane, decane, benzene, toluene, etc.

The condensation reaction of carbonyl and mercaptoalcohols and etherification of their products, according to the invention, may be carried out in the first step of the process at atmospheric or subatmospheric, or autogenous, or superatmospheric pressures, and are usually conducted in an enclosed vessel, in the presence of an inert solvent and with suitable agitation to promote a more efficient contact of the reactants and facile removal of water formed as the by-product of the reactions. The polymeric products formed may, in general, easily be separated in the second step of the process from unreacted reactants and the reaction aids such as the acid catalyst and inert solvents by any of the sundry and usual separatory methods known to the art.

Carbonyl compounds,

which may be used in the first step of the process of the invention have at least one carbonyl group. The groups R and R' may be hydrogen or organic entities that may be hydrocarbon in nature, say alicyclic, aliphatic, aromatic or alkaryl groups, having from about 1 to 25 carbon atoms, the chains of which may be interrupted by chalcogen, that is oxygen or sulfur, atoms or olefinic groups or carbonyl groups, and may have pendant thereto substitution by alkyl, halogen, aryl, mercaptan or hydroxyl groups. Typical of the useful carbonyl compounds are acetone, formaldehyde, acetaldehyde, glyoxal, acrolein, crotonaldehyde, furfuraldehyde, $CF_3CHO$, $CCl_3CHO$, chlorobenzaldehyde, dichlorobenzaldehyde, methyl ethyl ketone, diethyl ether methyl ketone, diphenylene ketone, arylalkyl ketone and, aryl mercaptoalkyl ketone; which carbonyl compounds may also be halo-substituted. The preferred carbonyl compounds for present use are formaldehyde, acetaldehyde, benzaldehyde, acetone and methyl ethyl ketone and mixtures thereof.

The mercaptoalcohols, HS—Q—OH, which may be used to practice this invention have at least one mercaptan and at least one hydroxyl group. The intervening group Q is an organic divalent entity that may be hydrocarbon, say alicyclic or aliphatic or aromatic or alkaryl, in nature having from about 2 to 25 carbon atoms, the chains of which may be interrupted by chalcogen, that is oxygen or sulfur atoms or olefinic groups or carbonyl groups and may have pendant substitution thereto by alkyl, halogen, aryl mercaptan or hydroxyl groups. Typical of the most useful mercaptoalcohols are

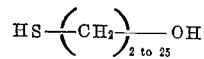

HS(alkyl)(aryl)OH, mercaptocyclobutanol, 3,6-dimercaptopentamethylene glycol, mercaptopropanol, 1,2 - dihydroxy 3 mercapto propane. The preferred mercaptoalcohol is 2-mercaptoethanol.

It is to be noted that this invention also contemplates reaction in like manner to Equations 1 to 5 of carbonyl compounds which may contain a plurality of carbonyl groups therein, that is to say where the groups R and R' may have one or more carbonyl groups as a part thereof, and with mercaptoalcohols which also may contain a plurality of mercaptan and/or a plurality of hydroxyl groups therein.

Useful strong acids which may be used to promote condensation of carbonyls and mercaptoalcohols and to promote etherification to form the present novel sequentially alternate gem dithioether and gem diether and/or ether group containing polymers which have active hydrogen groups include the concentrated non-oxidative strong inorganic acids such as sulfuric acid and hydrochloric acid, and the strong organic acids such as p-toluene chlorosulfonic acid and trichloroacetic acid. In general, non-oxidative strong acids which have a $pK_a$ of about 2.5 or less may be used herein in catalytically effective amounts.

A third step in the instant process is pursued when it is desired to provide polymers with terminal groups of isocyanate functionally, that is to say urethane-type prepolymers, or joining groups which are urethane in nature that is to say urethane plastics or rubbers: reacting the products of the first step and/or of the second step with polyisocyanates.

steps the smaller the mercaptan content and concomitant-steps of the instant process may desirably be used as intermediates in the formation of urethane-type prepolymers by reaction with non-polymeric polyisocyanates, $M(NCO) \geq_2$, that is non-polymeric compounds containing a plurality of reactive isocyanate, —NCO, groups. To form urethane-type prepolymers the ratio of reactants employed as given by the number of equivalent weights of the polyisocyanate compound based on the number of isocyanate groups per molecular weight of the polyisocyanate compound, to the number of average equivalent weights of the polymers based on the number of active hydrogen groups, i.e. hydroxyl and/or mercaptan groups, per average molecular weight of the polymer products of the first and/or second steps, is at least about 1.5/1, and preferably about 1.7/1 to 3.0/1, i.e. NCO/H$\geq$1.5/1. Reaction in these ratios provides polymeric products with groups which are isocyanate terminated, i.e. urethane-type prepolymers.

Another use of the active hydrogen containing polymer products prepared in the first and second steps of the process are as intermediates in the formation of urethane-type plastics, rubbers and other chain-extended and/or cross-linked polyurethanes by reaction with either non-polymeric polyisocyanates and/or urethane-type prepolymers wherein the ratio NCO/H is 0.75/1 to about 1.7/1. The polyurethane reaction products of the third step as those polymer products of the first and second steps are characterized by having alternating gem diether and/or ether and gem dithioether backbone units which impart to them unusual structure and properties, e.g. greater resistance to chemical and/or physical chain scission than otherwise identical disulfide polymers such as polythiopolymercaptans that are formed with alternating polysulfide and gem diether and/or ether linkages.

In pursuing the third step of the instant process, the polymer products of the first and/or second steps are admixed with a non-polymeric polyisocyanate in an inert environment, devoid of water or other active hydrogen containing substances, say, under a blanket of inert gas such as nitrogen. The reaction is usually conducted at temperatures of from 20 to 150° C. for from about 10 minutes to 24 hours.

Suitable polyisocyanates which may be used in the third step of the instant process may be aliphatic or aromatic or alkaryl in nature. Typical of the useful polyisocyanates are the aromatic diisocyanates, e.g. the isomers of toluene diisocyanate, m - phenylene diisocyanate, 4 - chloro - o,3 phenylene diisocyanate, 4,4'-biphenylene diisocyanate, and 1,5-naphthalene diisocyanate; and the aliphatic diisocyanates, such as 1,4'-tetramethylene diisocyanates, 1,10-decamethylene diisocyanate, 1,4 - cyclohexane diisocyanate, and 4,4'-methylene-bis(cyclohexyl isocyanate); and the alkaryl diisocyanates, e.g. 4,4′-methylene-bis(phenylene isocyanate). The reactive isocyanate groups of the prepolymer may also be in a blocked or "masked" form, such as occurs when the isocyanate groups of the prepolymer are reacted with a blocking or masking compound.

Thus, the polymers of this invention contain not only sequentially alternate linkages of gem dithioether and gem diether and/or ether groups but may also contain reactive hydroxyl and/or mercaptan or isocyanate groups.

The following examples illustrate modes of practicing the invention, the scope of which, however, is not limited thereto.

EXAMPLE 1

Liquid poly[ethylene (gem dithioether) (gem diether) ether] polymer of 800 molecular weight Approximately 2 mols (156 g.) of 2-mercaptoethanol, 2 mols (60 g.) of dry formaldehyde in the form of paraformaldehyde, 45 ml. of benzene and 0.2 ml. of concentrated sulfuric acid catalyst were charged to a reactor, stirred, heated to reflux temperatures (78–80° C.) and maintained thereat for about 2 hours. In etherification, the water, a by-product of reaction, was then forcibly removed by azeotropic distillation with benzene at the reflux temperatures; benzene and other volatiles which remained were removed by distillation under vacuum. The liquid pot product remaining, hydroxyl-containing poly[ethylene (gem diothioether) (gem diether) (ether)] polymer, had 36.5% sulfur, 0.24 wt. % mercaptan, 4.19 wt. % hydroxyl and 0.13 wt. % water by analysis, and a molecular weight of about 812, based on hydroxyl content. The yield was 137 g., or 76% of theoretical.

EXAMPLE 2

Preparation of a urethane rubber

About 0.06 mol (50. g.) of the 800 molecular weight liquid hydroxyl-containing poly[ethylene (gem dithioether) (gem diether) (ether)] polymer prepared as in Example 1 was uniformly admixed with about 0.11 mol. (19.3 g. of a 4:1 mixture of the 2,4 and 2,6 isomers of toluene diisocyanate. The admixture reacted in air and formed a snappy urethane rubber in 1 hour at 100° C.

EXAMPLE 3

Poly[ethylene (gem dithioether) (gem diether) (ether)]

Approximately 2 mols (159 g.) of 2-mercaptoethanol, 2.1 mols (63 g.) of dry formaldehyde in the form of paraformaldehyde, 45 ml. of benzene and 0.2 ml. of concentrated sulfuric acid catalyst were charged to a reactor, stirred, heated to reflux temperatures (73–77° C.) and maintained thereat for one hour. Water of reaction was removed by azeotropic distillation. The pot mixture remaining was neutralized through the addition of about 5 g. of powdered calcium oxide. Benzene and other volatiles which remained were removed by distillation at reduced pressures (26 to 120° C. at 32 to 35 mm. of Hg). The pot contents remaining were then filtered to remove solids and to provide a water white liquid polymer. It had 36.45 wt. percent sulfur, 0.029 wt. percent mercaptan, 1.58 wt. percent hydroxyl and 0.056 wt. percent water by analysis, and a molecular weight of about 2,150 based on hydroxyl content. The yield was 132 g., or 72% of theoretical.

EXAMPLE 4

Liquid urethane poly[ethylene (gem dithioether) (gem diether) (ether)] prepolymer About 0.047 mol (100 g.) of the 2,000 molecular weight hydroxy-terminated liquid polymer, prepared as in Example 3, was admixed for 10 minutes with 0.1 ml. of concentrated sulfuric acid, to remove any calcium oxide remaining therein. The admixture and about 0.0935 mol (16.3 g.) of a 4:1 2,4/2,6 isomer mixture of toluene diisocyanate were then reacted under nitrogen with stirring for 3 hours at 100 to 110° C. The polymer diisocyanate product produced was a clear yellow liquid urethane-prepolymer which was quite viscous and only difficultly pourable.

EXAMPLE 5

Air-moisture cure of prepolymer

A portion of the prepolymer, formed as in Example 4, was exposed to the moisture in the air, but showed no signs of curing in 24 hours at room temperature (about 80° F.). A portion of the prepolymer was admixed with a small quantity (about 0.1% by weight) of the curing accelerator tin octoate, and also exposed to the moisture in the air at room temperature. Within 48 hours the prepolymer had cured to a snappy urethane rubber. Another portion of the prepolymer was admixed with a small quantity of tin octoate, and was then laid down as a wet film on glass. The film cured upon exposure to the moisture of the air within a 4-day period to a tough elastomeric film. The rubber film was then heated at 100° C. in air for 5 hours and it further toughened.

EXAMPLE 6

Low-melting solid poly[ethylene (gem dithioether) (ether)] polymer

In similar manner to that used in Example 3, 2 mols (156 g.) of 2-mercaptoethanol, 1.05 mols (31.5 g.) of paraformaldehyde were reacted in the presence of 0.2 ml. of concentrated sulfuric acid catalyst and 45 ml. of benzene to form the dihydroxy diethylene gem dithioether compound. Water of reaction was forcibly removed to etherify the compound to a 1,200 molecular weight polymer. The pot contents were neutralized with calcium oxide and the benzene and other volatiles were removed, as was described in Example 3. The pot product was a waxy solid polymer which had 38.65 wt. percent sulfur, 0.3 wt. percent mercaptan and 2.67 wt. percent hydroxyl, by analysis, a molecular weight of about 1,275 based on hydroxyl content, and a melting point of about 90° C. Brittle thread-like fibers were easily drawn from the melted polymer. A melt-molded solid cake of polymer, however, was not brittle and did not shatter even when slammed to the floor, but appeared to have some bounce. The polymer product yield was 123, or 81.7% of theoretical.

EXAMPLE 7

Liquid poly[ethylene (methyl gem dithioether) (gem diether) (ether)] polymer

In this example, sequential reaction of 2-mercaptoethanol with acetaldehyde, and then the product mixture therefrom with formaldehyde was conducted, and then etherified.

About 2 mols (156 g.) of 2-mercaptoethanol and 1 mol (44 g.) of acetaldehyde in the presence of 0.2 ml. of concentrated sulfuric acid catalyst were heated to and maintained at 50° C. for approximately 10 hours to form dihydroxy diethylene (methyl gem dithioether). Then, about 1.05 mols (31.5 g.) of paraformaldehyde and 45 ml. of benzene were charged to the pot to form alternating gem diether linkages. The reactants were slowly heated to reflux temperatures, about 74° C., and water of reaction was concomitantly forcibly removed by azeotropic distillation with benzene to chain extend with ether linkages. To hasten the removal of water, another 25 ml. of benzene was added, and distillation was continued, for a total distillation time of 3 hours. The pot contents were then neutralized at room temperature with 5 g. of calcium oxide. Benzene and the other volatiles remaining were removed at about 110° C. and 35 mm. of Hg. The liquid pot product resulting was filtered, to yield a clear light yellow liquid polymer which had 36.2 wt. percent sulfur, 0.01 wt. percent mercaptan, 3.74 wt. percent hydroxyl and 0.24 wt. percent water by analysis, and a molecular weight of about 910 based on hydroxyl content. It was obtained in 115 g. yield, about 76% of theoretical.

EXAMPLE 8

Preparation and air-moisture cure of a liquid urethane prepolymer

About 0.0825 mol (75 g.) of the hydroxyl-containing liquid polymer, prepared as in Example 7, was reacted under nitrogen at 100 to 110° C. for 3 hours with about 0.167 mol (28.9 g.) of a 4:1 2,4:2,6-isomer mixture of toluent diisocyanate to provide a liquid urethane prepolymer, that had a dark brown color and a sweet odor similar to acetaldehyde. A portion of the prepolymer was exposed to the moisture in the air at room temperature, and cured to a slightly foamed rubber within one week.

EXAMPLE 9

Waxy polymer of poly[ethylene (methyl gem dithioether) (ether)] polymer

About 2 mols (156 g.) of 2-mercaptoethanol and 1 mol (44 g.) of acetaldehyde were reacted for about 10 hours at 50° C. in the presence of 0.2 ml. of concentrated sulfuric acid catalyst to provide dihydroxy diethylene (methyl gem dithioether). About 70 ml. of benzene was added. In etherification the water of reaction was then forcibly removed by azeotropic distillation, the pot contents were neutralized at room temperature with CaO. and volatiles were removed by distillation. The pot product upon cooling formed a wax-like solid polymer in 120 g. yield, or 73.2% of theoretical. The polymer obtained had a melting point of about 88° C., 40.9 wt percent sulfur, 5.62 wt. percent hydroxyl, by analysis, and a molecular weight of about 605, based on the hydroxyl content.

What is claimed is:

1. A polymeric material having in its polymeric backbone consecutively alternate gem dithioether and ether groups each separated one from another by a divalent organic group, said polymeric material being prepared by
A. reacting
    (1) a mercaptoalcohool having the general formula HS—Q—OH where Q is an organic hydrocarbon group containing from 2 to 25 carbon atoms and being selected from the group consisting of aliphatic, aromatic, alicyclic and alkaryl groups which may contain pendant halogen, alkyl or nitro groups and
    (2) a carbonyl compound having the general formula

where R and R' are selected from the group consisting of H and organic groups containing from 1 to 25 carbon atoms and being selected from the group consisting of aliphatic, aromatic, alicyclic, and alkaryl groups which may contain pendant halogen, alkyl or nitro groups
in the presence of a strong non-oxidizing acid and in the substantial absence of added water using a ratio of mercaptan groups to carbonyl groups of about 2/1 until substantially all the mercaptan groups have reacted and
B. forcibly removing water as a by-product at a temperature of about 50 to 250° C.

2. A material as in claim 1 wherein the mercaptoalcohol is 2-mercaptoethanol.

3. A material as in claim 1 wherein the carbonyl compound is formaldehyde.

4. A material as in claim 1 wherein the carbonyl compound is acetaldehyde.

5. A material as in claim 2 wherein the carbonyl compound is formaldehyde.

6. A material obtained by further reacting the polymeric material of claim 1 with an organic polyisocyanate using a ratio of isocyanate groups to active hydrogen groups of the polymeric material in the range of about 0.75/1 to 3.0/1.

7. A material as in claim 6 wherein said ratio is 0.75/1 to 7.7/1.

8. A material as in claim 6 wherein said polyisocyanate is a non-polymeric polyisocyanate and said ratio is about 1.7/1 to 3.0/1.

9. A method for preparing a polymeric material which comprises
A. reacting
    (1) a mercaptoalcohol having the general formula HS—Q—OH where Q is an organic hydrocarbon group containing from 2 to 25 carbon atoms and being selected from the group consisting of aliphatic, aromatic, alicyclic and alkaryl groups which may contain pendant halogen, alkyl or nitro groups and
    (2) a carbonyl compound having the general formula

where R and R' are selected from the group consisting of H and organic groups containing from 1 to 25 carbon atoms and being selected from the group consisting of aliphatic, aromatic, alicyclic, and alkaryl groups which may contain pendant halogen, alkyl or nitro groups
in the presence of a strong non-oxidizing acid and in the substantial absence of added water using a ratio of mercaptan groups to carbonyl groups of about 2/1 at a temperature of 15 to 150° C. for a period of 0.5 to 60 minutes until substantially all of the mercaptan groups have reacted and
B. forcibly removing water as a by-product at a temperature of about 50 to 250° C.

10. A method as in claim 9 wherein the water by-product is forcibly removed by distillation.

References Cited

UNITED STATES PATENTS 2,900,368   8/1959   Stilmar _____ 260—77.5
3,256,246   6/1966   Gutweiler et al. _____ 260—67

OTHER REFERENCES

Schonfeld, Journal of Polymer Science, vol. XLIX, pp. 277–282 (1961).

WILLIAM H. SHORT, *Primary Examiner.*

L. M. PHYNES, *Assistant Examiner.*

U.S. Cl. X.R.

260—77.5, 79, 609, 63

UNITED STATES PATENT OFFICE
CERTIFICATE OF CORRECTION

Patent No. 3,446,775                                May 27, 1969

Eugene R. Bertozzi et al.

It is certified that error appears in the above identified patent and that said Letters Patent are hereby corrected as shown below:

Column 2, line 45, $-\overset{|}{\underset{|}{C}}=\overset{|}{\underset{|}{C}}-$     should read     $-\overset{|}{\underset{|}{C}}=\overset{|}{\underset{|}{C}}-$ Column 3, line 30, "SH/C-O" should read -- SH/C=O --; line 75, "either" should read -- ether --. Column 4, line 31, "theoether" should read -- thioether --; line 46, before "reactions" insert -- products of --. Column 5, line 44, before "glyoxal" insert -- benzaldehyde --; same line 44, "crontonaldehyde" should read -- crotonaldehyde --. Column 6, line 18, "functionally" should read -- functionality --; line 23, cancel "steps the smaller the mercaptan content and concomitant-" and insert -- Indeed, the polymer products of the first and second --; line 73, "1,4′-tetramethylene" should read -- 1,4-tetramethylene --. Column 7, line 29, "diothioether" should read -- dithioether --; line 42, "(19.3 g" should read -- (19.3g.) --. Column 8, line 38, "0.3" should read -- 0.03 --. Column 9, line 11, "toluent" should read -- toluene --; line 42, "mercaptoalcohool" should read -- mercaptoalcohol --. Column 10, line 14, "7.7/1" should read -- 1.7/1 --.

Signed and sealed this 7th day of July 1970.

(SEAL)
Attest:

EDWARD M. FLETCHER, JR.                      WILLIAM E. SCHUYLER, JR.
Attesting Officer                                  Commissioner of Patents